United States Patent
Barmettler

(10) Patent No.: US 7,590,142 B2
(45) Date of Patent: Sep. 15, 2009

(54) ADAPTER CHANNEL MAPPING SYSTEM AND METHOD

(75) Inventor: Mark G. Barmettler, Cedar Hill, TX (US)

(73) Assignee: Avo Multi-Amp Corporation DBA Megger, Dallas, TX (US)

(*) Notice: Subject to any disclaimer, the term of this patent is extended or adjusted under 35 U.S.C. 154(b) by 986 days.

(21) Appl. No.: 10/816,738

(22) Filed: Apr. 2, 2004

(65) Prior Publication Data
US 2005/0220138 A1    Oct. 6, 2005

(51) Int. Cl.
H04J 3/16 (2006.01)

(52) U.S. Cl. .................. 370/465; 370/285

(58) Field of Classification Search ............. 370/362, 370/364, 437, 465, 285, 401, 402
See application file for complete search history.

(56) References Cited

U.S. PATENT DOCUMENTS

| | | | |
|---|---|---|---|
| 5,467,021 A | 11/1995 | Adamian et al. | |
| 5,532,603 A | 7/1996 | Bottman | |
| 5,559,427 A | 9/1996 | Hinds et al. | |
| 5,572,695 A * | 11/1996 | Andrews et al. | 711/202 |
| 5,629,628 A | 5/1997 | Hinds et al. | |
| 5,677,633 A | 10/1997 | Moser et al. | |
| 5,698,985 A | 12/1997 | Bottman | |
| 5,714,885 A | 2/1998 | Lulham | |
| 5,846,236 A | 12/1998 | Lindenmeier et al. | |
| 6,022,347 A | 2/2000 | Lindenmeier et al. | |
| 6,041,041 A | 3/2000 | Ramanathan et al. | |
| 6,388,437 B1 | 5/2002 | Wolski et al. | |
| 6,397,159 B1 | 5/2002 | Richardson | |
| 6,522,152 B1 | 2/2003 | Tonti et al. | |
| 6,611,147 B2 | 8/2003 | White et al. | |
| 6,823,283 B2 | 11/2004 | Steger et al. | |
| 6,847,213 B2 | 1/2005 | Renken et al. | |
| 7,035,959 B2 | 4/2006 | Umezu et al. | |
| 7,053,830 B2 | 5/2006 | Krumm et al. | |
| 7,165,005 B2 | 1/2007 | Steger et al. | |
| 7,178,562 B2 | 2/2007 | Memmott et al. | |
| 7,187,861 B2 | 3/2007 | Ruchet | |
| 2003/0074489 A1 | 4/2003 | Steger et al. | |
| 2004/0113604 A1 | 6/2004 | Renken et al. | |
| 2004/0263388 A1 | 12/2004 | Krumm et al. | |
| 2005/0044260 A1 | 2/2005 | Abramson et al. | |
| 2005/0270236 A1 | 12/2005 | Krumm et al. | |
| 2007/0154212 A1 | 7/2007 | Ruchet et al. | |

* cited by examiner

Primary Examiner—Brenda Pham
(74) Attorney, Agent, or Firm—Conley Rose, P.C.; J. Robert Brown, Jr.

(57) ABSTRACT

An adapter channel mapping system for mapping channels of a network is provided. The system comprises a memory component operable to communicate with the network and having a first and a second memory portion, the first memory portion operable to communicate with a first physical channel of the network and the second memory portion operable to communicate with a second physical channel of the network and a mapping component operable to map, based on a first map, to the first and second memory portions based on a first configuration of the network and further operable to map, based on a second map, to the first and second memory portions based on a second configuration of the network. A method for testing networks employing 568A or 568B channel adapters is also provided. A method for selectively testing networks employing different channel adapters is also provided.

10 Claims, 7 Drawing Sheets

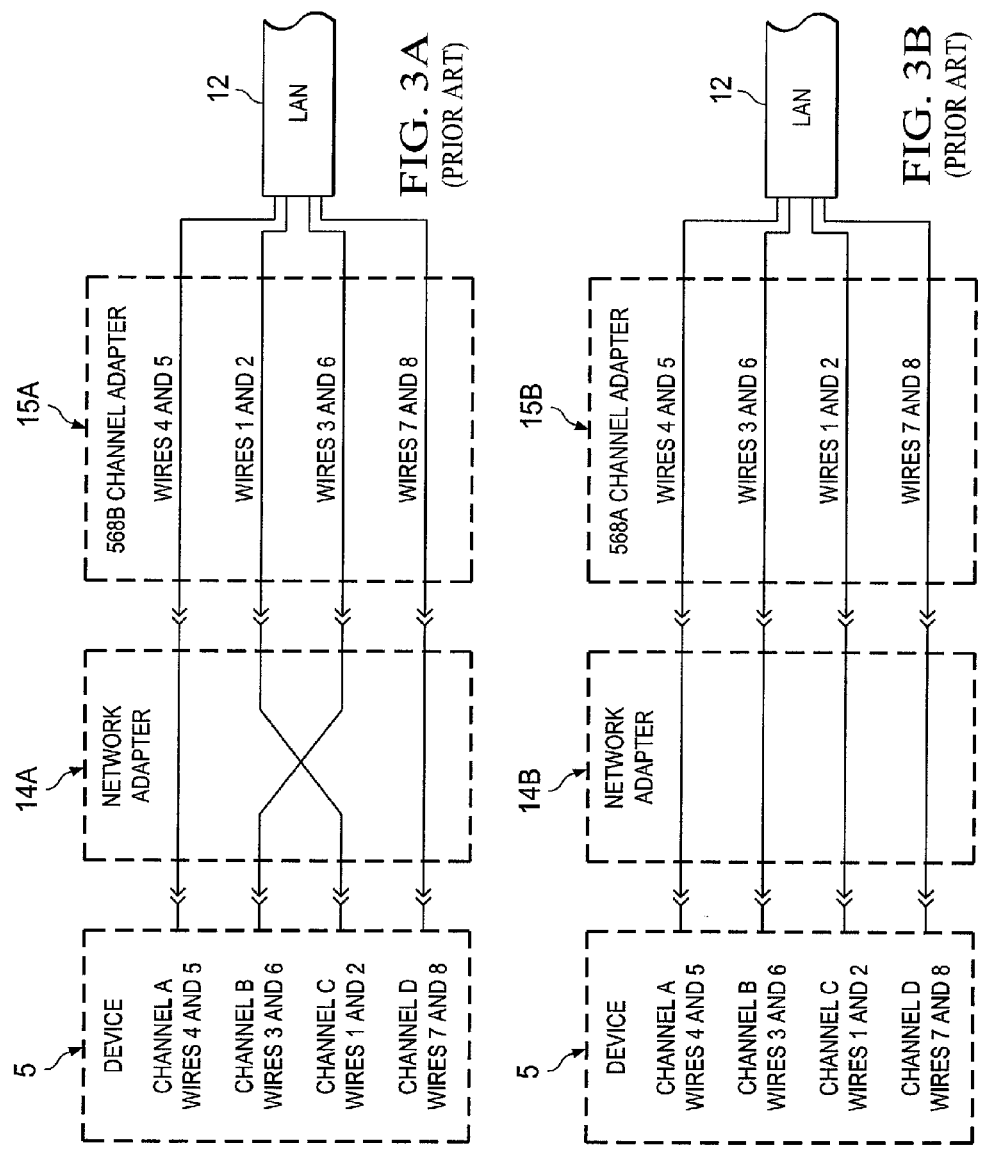

ADAPTER CHANNEL MAPPING SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention is directed to measurement devices and connectors, and more particularly, but not by way of limitation, to a system and method for adapter channel mapping of local area network channels.

BACKGROUND OF THE INVENTION

Connecting devices to local area networks (LANs) is typically accomplished using a network adapter to achieve the connection. A typical LAN topology might include a four-channel copper wiring system wherein each channel includes a pair of copper wires that are shielded to reduce interference between the channels. The LAN may include a number of channel adapters, which are wall plates with a female jack, and link adapters, which are male plugs connected to the LAN. It will be appreciated that connecting devices to the LAN requires the correct channel adapter or link adapter, depending upon the network topology at a particular location in the LAN.

To certify LAN cabling, a measurement or test device is connected at one point in the LAN and a second measurement or test device is connected at another point in the LAN. The first measurement device, for example, generates a test signal that is transmitted through the LAN cabling. This test signal is received by the second measurement device, which analyzes the received test signal to evaluate the integrity of the cabling. When the LAN cabling does not meet certification standards, the contractor, such as a building construction company or network installer, is required to repair or replace the network cabling to bring the LAN into compliance with the LAN certification standards.

The LAN measurement or test device is typically constructed to generate precise test signals for transmission across the network which are measured by the second measurement or test device which is designed to measure at a high-level of accuracy the received test signal for these purposes. Network adapters that connect the measurement device to the network, however, may introduce communication errors or deficiencies which cannot be distinguished from deficiencies in the LAN cabling. For example, a signal transmitted by the measurement device that is degraded by the adapter may be analyzed as being deficient for certification purposes as measured by the second measurement device. In this instance, the LAN cabling would fail the certification and require repair or replacement, when in fact the adapter was the cause of the errors. For this reason, it is imperative that the adapters, particularly in a measurement test environment, not introduce errors or otherwise interfere with the signals to insure that only the LAN cabling is being tested. These network adapters may be expressly designed and manufactured to be suitable for LAN certification measurement purposes.

SUMMARY OF THE INVENTION

The present embodiment provides an adapter channel mapping system for mapping channels of a network. The adapter channel mapping system comprises a memory component operable to communicate with the network and having a first memory portion and a second memory portion, the first memory portion operable to communicate with a first physical channel of the network and the second memory portion operable to communicate with a second physical channel of the network and a mapping component operable to map, based on a first map, to the first and second memory portions based on a first configuration of the network and further operable to map, based on a second map, to the first and second memory portions based on a second configuration of the network.

In one embodiment, an adapter channel mapping system for mapping channels of a network employing a first wired pair associated with a first network channel, a second wired pair associated with a second network channel, a third wired pair associated with a third network channel, a fourth wired pair associated with a fourth network channel, the adapter channel mapping system is provided. The adapter channel mapping system comprises a test device coupleable to a channel adapter of the network, a memory component coupled to the test device having a first, second, third, and fourth memory portions, the first memory portion coupleable to communicate with the first network channel, the second memory portion coupleable to communicate with the second network channel, the third memory portion coupleable to communicate with the third network channel, and the fourth memory portion coupleable to communicate with the fourth network channel, and a mapping component operable to map a first variable to first memory portion and a fourth variable to the fourth memory portion, the mapping component operable to selectively map a second and third variables between the second and third memory portions based on a configuration of the network.

In one embodiment a method for network adapter channel mapping is provided. The method comprises providing a network having a network configuration, coupling a device to the network, the device having a first and second channel components operable to receive signals associated with at least a first and second channels of the network, selecting the network configuration of the network, directing the signals associated with the first network channel to one of the first and second channel components of the device based on the network configuration selected, and directing the signals associated with the second network channel to other of the first and second channel components of the device based on the network configuration selected.

In one embodiment a method for testing networks employing either 568A or 568B channel adapters is provided. The method comprises determining a type of a channel adapter used by a network, connecting a test device for testing local area networks to the channel adapter employed by the network, selecting, using a selection component, the type of channel adapter employed by the network, communicating a first signal of the network associated with a first wired pair to a portion on the test device based on the type of channel adapter selected, and communicating a second signal of the network associated with a second wired pair to a second portion on the test device based on the type of channel adapter selected.

In one embodiment a method for selectively testing networks employing different channel adapters is provided. The method comprises connecting a test device to a local area networks for testing, selecting a configuration type of the network, mapping channels of the network based on the configuration type of the network, and testing the channels of the network the using the mapping of the channels of the network.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 3A illustrates the wiring of a network adapter for data cabling 568B.

FIG. 3B illustrates the wiring of a network adapter for data cabling 568A.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Figure 1:
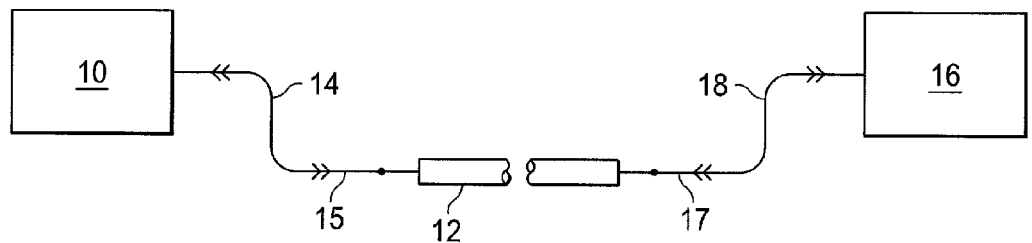
FIG. 1 illustrates an exemplary network for testing a local area network.

Tuning to FIG. 1, a typical set-up for testing the cabling of a local area network (LAN) is depicted. The following description may speak about testing a LAN, but it is understood that this description refers only to testing the LAN cabling and not to testing the computers, the printers, or the other intelligent devices which may communicate over the LAN cabling. A transmitting test device 10, which generates and transmits a test signal, is connected to a LAN 12 by a first network adapter 14. Network adapters are used to couple test devices to a LAN, for example the first network adapter 14 is used to couple the transmitting test device 10 to the LAN 12. The first network adapter 14 connects to a first channel adapter 15, and the first channel adapter 15 is connected to the LAN 12. A receiving test device 16, which receives a test signal, is connected to the LAN 12 by a second network adapter 18. The second network adapter 18 connects to a second channel adapter 17, and the second channel adapter 17 is connected to the LAN 12.

The transmitting test device 10 transmits a test signal through the first network adapter 14 onto the LAN 12, and the receiving test device 16 receives the test signal through the second network adapter 18. The receiving test device 16 compares the received test signal to the expected test signal and evaluates the quality of the LAN 12. The LAN channel adapters 15 and 17 may comply, for example, with one of two alternate data cabling standards—568A data cabling and 568B data cabling. Both 568A and 568B support four pairs of wires, but they identify the pairs differently.

Figure 2:
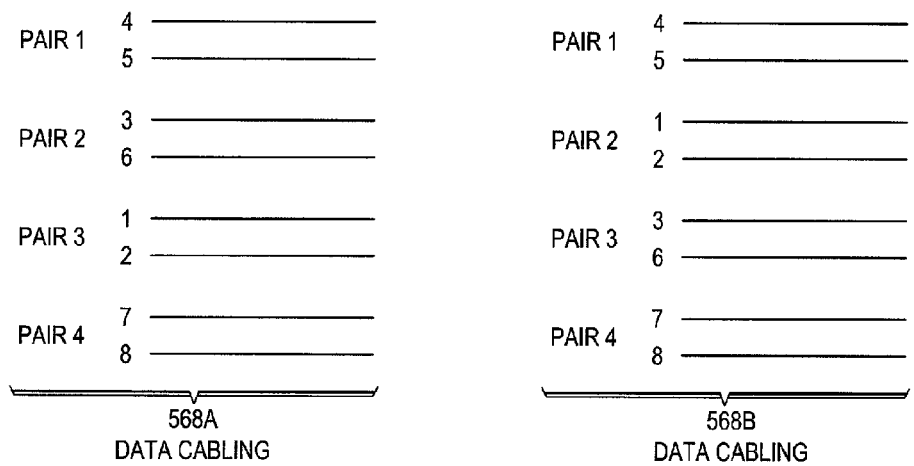
FIG. 2 illustrates the wire configurations of data cabling standards 568A and 568B.

Turning now to FIG. 2, the cabling configurations of 568A and 568B are depicted side by side. In 568A data cabling wires 4 and 5 comprise pair 1, wires 3 and 6 comprise pair 2, wires 1 and 2 comprise pair 3, and wires 7 and 8 comprise pair 4. In 568B data cabling, wires 4 and 5 comprise pair 1, wires 1 and 2 comprise pair 2, wires 3 and 6 comprise pair 3, and wires 7 and 8 comprise pair 4. Note that the pair identification for wires 1 and 2 and wires 3 and 6 is reversed between the 568A and 568B data cabling.

Typically, test devices 10 and 16 are designed to require connection of these wire pairs to specific channels on the test devices 10 and 16. For example, a specific test device 10 may require channel A to be connected to wires 4 and 5, channel B to be connected to wires 3 and 6, channel C to be connected to wires 1 and 2, and channel D to be connected to wires 7 and 8. This corresponds to the wiring configuration of 568A channel adapters.

If the LAN 12 that employs 568B channel adapters is to be tested using test devices 10 and 16, however, some means is needed to swap the pair associated with wires 1 and 2 with the pair associated with wires 3 and 6. In the past, this means has typically been provided by employing network adapters 14 and 18 which physically cross these pairs.

Turning now to FIG. 3A, a device 5, a network adapter 14A, a channel adapter 15A, and the LAN 12 are depicted. The device 5 is provided for purposes of illustration only and may be any component, system or device coupleable to the LAN 12 network. In the past, the network adapter 14A physically crossed the pair associated with wires 1 and 2 with the pair associated with wires 3 and 6 in order to present the wire pairs to the device 5 in the physical configuration required by the device 5 when connecting to the LAN 12 having 568B channel adapters 15A. For comparison, FIG. 3B depicts a network adapter 14B which does not provide physical crossing of pairs and which is suitable for connecting to the LAN 12 that employs 568A channel adapters 15B.

The use of the network adapter 14A which physically crosses pairs, as depicted in FIG. 3A, is an effective, but expensive solution to the problem described above. To be equipped to test LANs 12 on different corporate campuses two sets of network adapters 14 and 18 may be required—a set which employs uncrossed pairs and a set which employs crossed pairs. In addition, the test kit becomes larger because it includes extra cables and may be more cumbersome and unwieldy as a consequence. In one embodiment, the present disclosure contemplates overcoming the drawbacks of the physical pair crossing solution by remapping the pairs internally, in software processing. It is contemplated that this innovation may be applied not only to testing LANs 12 with 568A or 568B channel adapters 15A and 15B, but also to testing LANs 12 built according to other cabling standards.

Figure 4A:
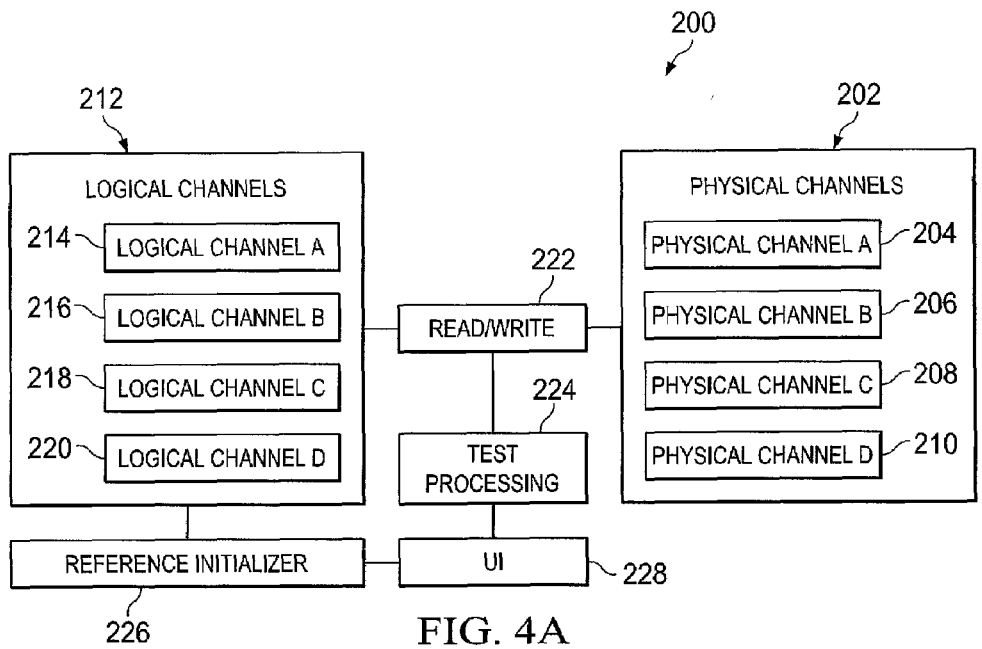
FIG. 4A illustrates an adapter channel mapping system according to a first embodiment.

Turning now to FIG. 4A, a block diagram of one embodiment of an adapter channel mapping system 200 is depicted. Physical channels 202 comprise a physical channel A 204, a physical channel B 206, a physical channel C 208, and a physical channel D 210. When the adapter channel mapping system 200 is employed in a testing environment, the physical channels 202 are in communication with the first network adapter 14 or the second network adapter 18. Data may be transmitted, for example in the form of signals, to the first network adapter 14 or to the second network adapter 18. These signals are sampled when received and the resulting data is first stored in the physical channels 202 and then transmitted, again in the form of signals, from the physical channels 202 to the first network adapter 14 or to the second network adapter 18. It should be understood that the term data, as used herein, may include, but is not limited to, any information that is manipulated, stored, or otherwise processed which may be communicated in the form of, for example, signals, but data may also be communicated in other manners. In some cases, the terms data and signals may be used interchangeably, for example, data may be transmitted and signals may be processed or stored and the present disclosure should not be limited based on functions or actions that may be performed on or uses for data and signals. In some embodiments, there may be no distinction between storing data in the physical channels 202 and transmitting this data as signals from the physical channels 202. Similarly, data or signals received from the first network adapter 14 or the second network adapter 18 is received in the physical channels 202 and then stored in the physical channels 202. In some embodiments, there may be no distinction between receiving signals or data in the physical channels 202 and storing this data in the physical channels. The physical channels 202 may be memory locations or they may be the registers of input/output devices such as transmitter/receiver chips. This application incorporates herein by reference for all purposes U.S. patent application Ser. No. 10/740,699, entitled "Measurement Connector for Test Device" filed Dec. 19, 2003.

Logical channels 212 comprise a logical channel A 214, a logical channel B 216, a logical channel C 218, and a logical channel D 220. The logical channels 212 are memory locations. These memory locations store the addresses of or references to the physical channels 202.

A read/write module 222 is in communication with both the logical channels 212 and the physical channels 202. The read/write module 222 is operable to read the addresses or references stored in the logical channels 212 and to write data or signals to and read or sample data or signals from the physical channels 202 in accordance with the addresses or references read from the logical channels 212. The read/write module 222 is in communication with a test processing module 224 and services requests from the test processing module 224 to write data to and read data from locations addressed or referenced by the logical channels 212, thereby writing data to and reading data from the first network adapter 14 and the second network adapter 18 and hence the LAN 12. For example, the test processing module 224 may request the read/write module 222 to write data, which for example may be transmitted as signals, to logical channel A 214, whereupon the read/write module 222 reads the address or reference stored in logical channel A 214 and then writes the data to the location addressed or referenced by this address or reference. Because the logical channel A 214 contains the address or reference to one of the physical channels 202, the read/write module 222 writes the data out as signals to one of the physical channels 202—the physical channel whose address or reference is stored in logical channel A 214.

The test processing module 224 performs the functions that the transmitting test device 10 or the receiving test device 16 may perform, with the exception that writing data or signals to and reading or sampling the signals or data from the LAN 12 is delegated to the read/write module 222, under direction of the test processing module 224. The test processing module 224 sends requests to the read/write module 222 to write to and to read from the LAN 12 specifying channel names. The read/write module 222 looks-up the addresses or references stored in the associated logical channels 212 and then writes to or reads from the physical channels 202 and hence to write to or read from the LAN 12.

An initializer module 226 is in communication with the logical channels 212 and is operable to assign and reassign addresses stored in the logical channels 212. A user interface 228 is in communication with the initializer module 226 and is operable to select a network cabling type and communicate this selection to the initializer module 226. The initializer module 226 responds to the user interface module communicating a network cabling type selection by reassigning the addresses contained in the logical channels 212 as appropriate. In other embodiments the selection may be accomplished in some other way. For example, the selection of a network cabling type may be accomplished by a physical switch located on the adapter channel mapping system 201.

Figure 4B:
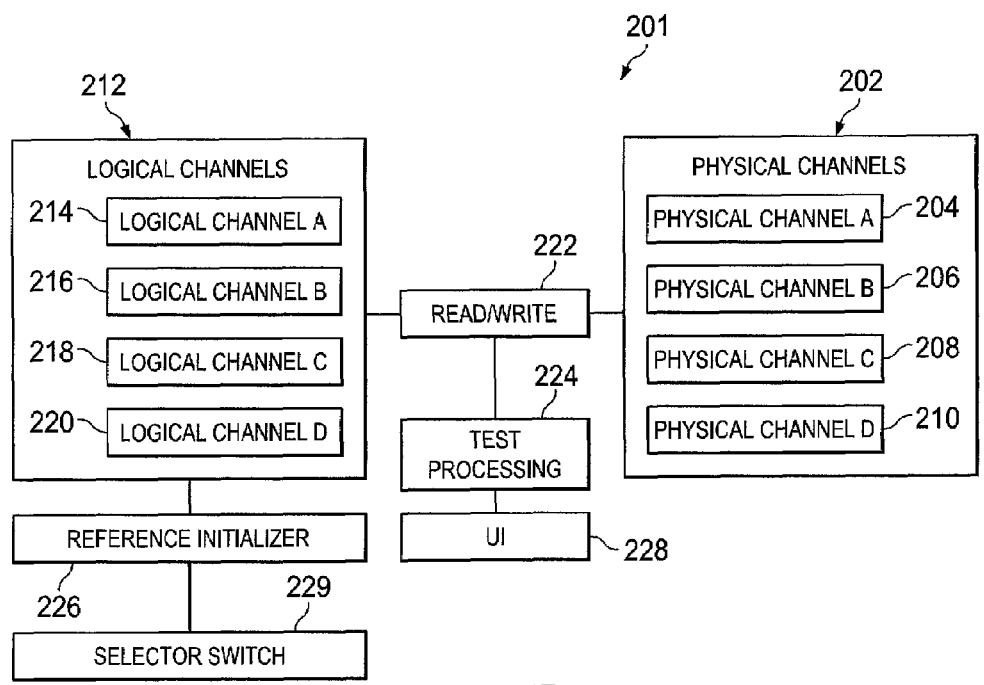
FIG. 4B illustrates an adapter channel mapping system according to another embodiment.

Turning now to FIG. 4B, an embodiment of an adapter channel mapping system 201 which employs a physical selector switch 229 to select the network cabling type is depicted. The physical selector switch 229 is in communication with the reference initializer 226 and is operable to select the network cabling type. The rest of the adapter channel mapping system 201 remains essentially identical to the adapter channel mapping system 200 depicted in FIG. 4A.

As another example, it may be possible to discover the network cabling type which is installed in the LAN 12 by the transmitting test device 10 and the receiving test device 16 exchanging a series of signals and to employ the discovery of the network cabling type to select the network cabling type. Because the test processing module 224 requests the read/write module 222 to read and write data using logical channel names, reinitializing the logical channel names can be employed to logically cross the wire pairs. An example is provided below to clarify this concept.

Figure 5A:
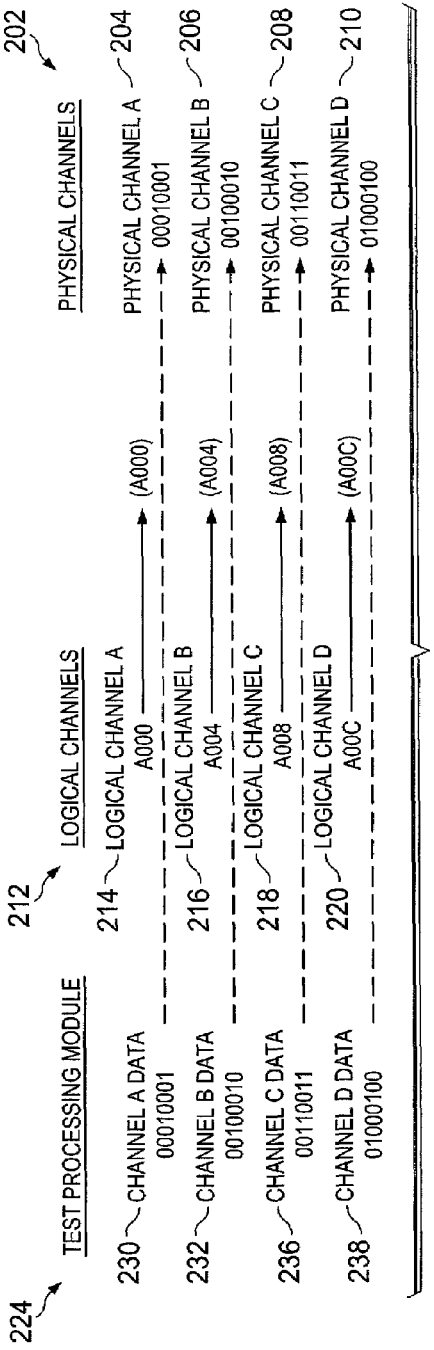
FIG. 5A illustrates a first mapping of logical channels to physical channels in an adapter channel mapping system.

Turning now to FIG. 5A, an example flow of test data from the test processing module 224 to the physical channels 202 is depicted. The physical channel A 204 is at address A000, the physical channel B 206 is at address A004, the physical channel C 208 is at address A008, and the physical channel D 210 is at address A00C. The logical channels 212 are shown to be initialized with the logical channel A 214 containing address A000, the logical channel B 216 containing address A004, the logical channel C 218 containing address A008, and the logical channel D 220 containing address A00C. On the left side of FIG. 5A, the test processing module 224 is depicted as containing test data values where a channel A data 230 is a binary number 00010001, a channel B data 232 is 00100010, a channel C data 236 is 00110011, and a channel D 238 data is 01000100.

When the test processing module 224 requests the read/write module 222 to write the test data values, which may for example be transmitted as signals, out to the LAN 12, the read/write module 222 writes the channel A data 230 to the memory location whose address or reference is contained in the logical channel A 214 (in this case to address A000 which references the physical channel A 204). When the test processing module 224 requests the read/write module 222 to write the test data values, as signals, out to the LAN 12, the read/write module 222 writes the channel B data 232 to the memory location whose address or reference is contained in the logical channel B 216 (in this case to address A004 which references the physical channel B 206). When the test processing module 224 requests the read/write module 222 to write the test data values, as signals, out to the LAN 12, the read/write module 222 writes the channel C data 236 to the memory location whose address or reference is contained in the logical channel C 218 (in this case to address A008 which references the physical channel C 208). When the test processing module 224 requests the read/write module 222 to write the test data values out to the LAN 12, the read/write module 222 writes the channel D data 238 to the memory location whose address or reference is contained in the logical channel D 220 (in this case to address A00C which references the physical channel D 210). The dotted arrowed lines depict the writing of data from the test processing module 224 to the appropriate physical channel memory. Once this data has been written to the physical channels 202, normal processes are employed to output this data, such as in the form of signals, to the first network adapter 14 or to the second network adapter 18.

Figure 5B:
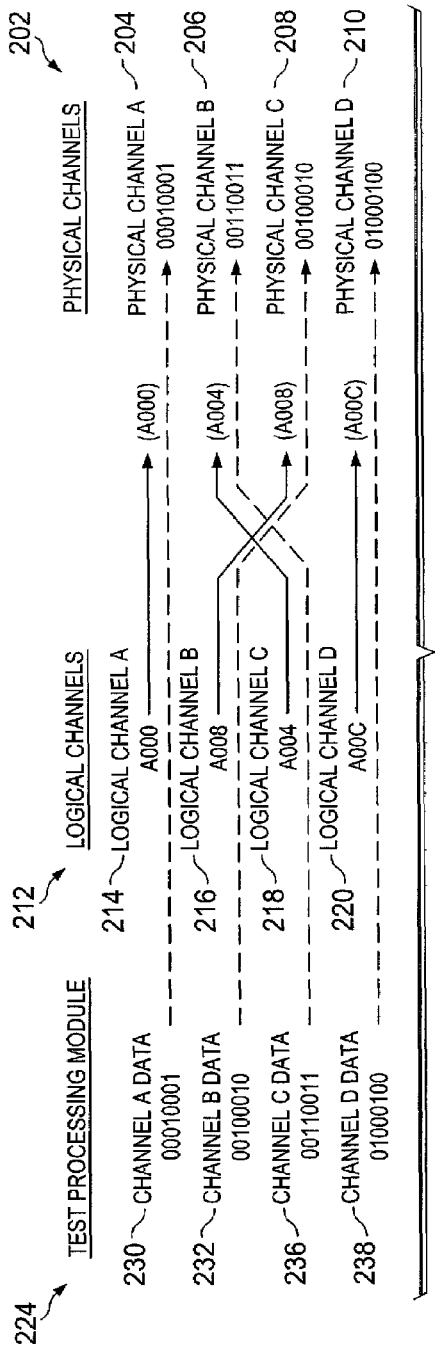
FIG. 5B illustrates a second mapping of logical channels to physical channels in an adapter channel mapping system.

Turning now to FIG. 5B, a second example flow of test data from the test processing module 224 to the physical channels 202 is depicted, in this case with the second and third wire pairs logically crossed. As in FIG. 5A, the physical channel A 204 is at address A000, the physical channel B 206 is at address A004, the physical channel C 208 is at address A008, and the physical channel D 210 is at address A00C. The logical channels 212 are shown to be initialized with the logical channel A 214 containing address A000, the logical channel B 216 containing address A008, the logical channel C 218 containing address A004, and the logical channel D 220 containing address A00C. On the left side of FIG. 5B, the test processing module 224 is depicted as containing test data values where the channel A data 230 is a binary number 00010001, the channel B data 232 is 00100010, the channel C data 236 is 00110011, and the channel D data 238 is 01000100. This test data is the same as that employed in FIG. 5A.

When the test processing module 224 requests the read/write module 222 to write the test data values out to the LAN 12, the read/write module 222 writes the channel A data 230 to the memory location whose address or reference is contained in the logical channel A 214 (in this case to address A000 which references the physical channel A 204). When the test processing module 224 requests the read/write module 222 to write the test data values out to the LAN 12, the read/write module 222 writes the channel B data 232 to the memory location whose address or reference is contained in the logical channel B 216 (in this case to address A008 which references the physical channel C 208). When the test processing module 224 requests the read/write module 222 to write the test data values out to the LAN 12, the read/write module 222 writes the channel C data 236 to the memory location whose address or reference is contained in the logical channel C 218 (in this case to address A004 which references the physical channel B 206). When the test processing module 224 requests the read/write module 222 to write the test data values, all of which may be transmitted in the form of signals, out to the LAN 12, the read/write module 222 writes the channel D data 238 to the memory location whose address or reference is contained in the logical channel D 220 (in this case to address A00C which references the physical channel D 210). Again, the dotted arrowed lines depict the writing of data out as signals from the test processing module 224 to the appropriate physical channels 202. Note, however, that the channel B data 232 has been written to the physical channel C memory location and the channel C data 236 has been written to the physical channel B memory location, effectively crossing the wire pairs logically. This logical crossing is effected by changing the addresses or references stored in the logical channels 212, for example by reinitializing the logical channels when selecting a data cabling type.

Returning to FIG. 4, the user interface 228 is also in communication with the test processing module 224 and supports various test set-up, test control, and test result display functions the description of which is not germane to the present disclosure.

The adapter channel mapping system 200 is one or more computer programs which may execute on various systems such as, but not limited to, a LAN test device and may be used in any implementation where multiple network adapters 14 or 18 are otherwise necessary. The read/write module 222, the logical channels 212, and the reference initializer 226 are shown as separate functional blocks, but these may all be combined in a single module. For example, the logical channels 212 may comprise four C language or C++ language pointer variables, meaning that these variables contain an address or pointer to a memory location. These pointer variables may be declared in the read/write module 222 and hence may be part of the memory space associated with the read/write module 222. Other computer programming languages maybe employed to implement the adapter channel mapping system 200. These computer programs may be embedded on the adapter channel mapping system 200 or may be otherwise employed as will suggest itself to one skilled in the art.

Further, the reference initializer 226 may be a C, C++, or other programming language function, defined as part of the read/write module 222, which is invoked by the user interface 228 when a data cabling type is selected. The read/write module 222 may also be provided as part of a task or process running in the test processing module 224. A similar structuring of these components may be accomplished using assembly language where indirect addressing modes could be applied to implement the distinction between logical channels 212 and physical channels 202. The read/write module 222 may be a device driver which takes into account special requirements of input/output devices with regards to timing, read/write selection, and chip select or enablement signals. In some embodiments no logical channel mapping is provided for the physical channel A 204 and the physical channel D 210, because these channels need not be remapped when testing 568A and 568B LANs 12. All of these considerations are readily apparent to those skilled in the art.

Figure 6:
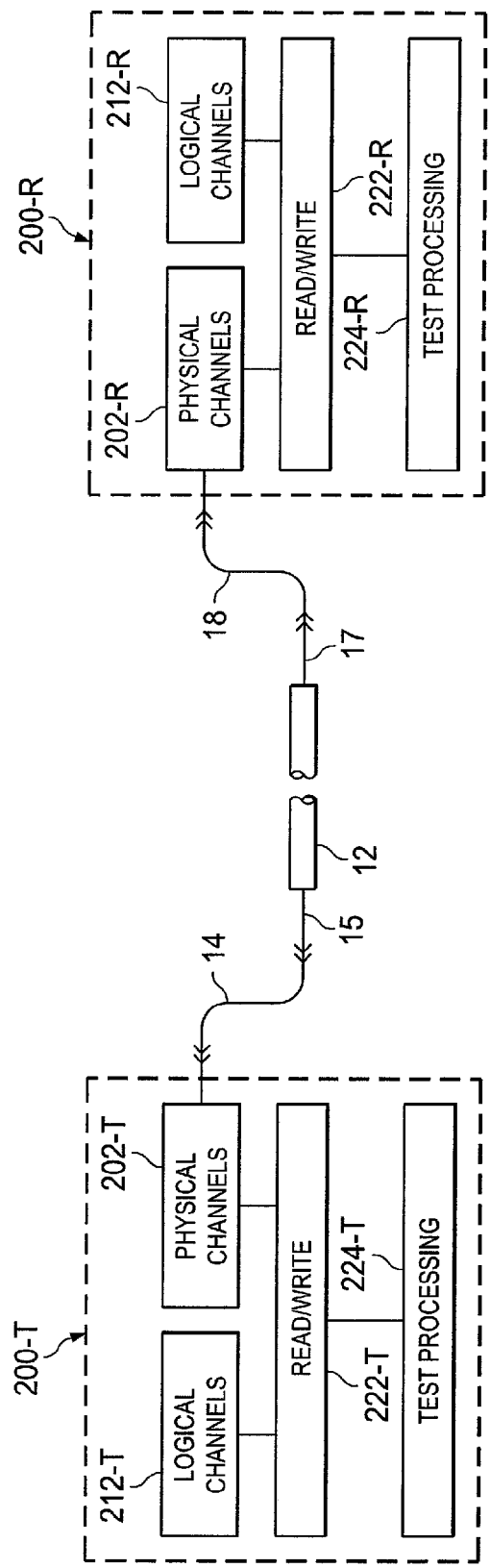
FIG. 6 illustrates a network employing the adapter channel mapping system for testing a local area network

Turning now to FIG. 6, the adapter channel mapping system 200 is shown deployed in a LAN testing configuration. The adapter channel mapping system 200-T transmits a test signal to the first network adapter 14 and hence to the LAN 12 and hence to the second network adapter 18. The adapter channel mapping system 200-R receives the test signal from the second network adapter 18. The user interface 228 and the reference initializer 226 are omitted from the drawing of both adapter channel mapping systems 200-T and 200-R, but it is understood that these functionalities may be supported in these systems. The components 202-T and 202-R correspond to the physical channels 202. The components 212-T and 212-R correspond to the logical channels 212. The components 222-T and 222-R correspond to the read/write component 222. The components 224-T and 224-R correspond to the test processing module 224.

While the embodiment described above directs itself to remapping channels depending upon selection of 568A or 568B network cabling types, in other embodiments other network cabling types may be selectable and other wire pair configurations may be supported by the transmitting test device 200-T and the receiving test device 200-R. For example, in some embodiments either more or fewer physical channels 202 and logical channels 212 may be employed to mate to fewer or more wire pairs in the network adapters 14 or 18. In some embodiments two sets of physical channels 202 and two sets of logical channels 212 may be present on each adapter channel mapping system 200 to support a first adapter channel mapping for writing data to and a second adapter channel mapping, for example a different mapping than that of the first adapter channel mapping, for reading or sampling data signals from the network adapter 14 or 18.

While the adapter channel mapping system 200 contemplates obviating the need to employ a separate set of network adapters 14 and 18 to test a 568B network cabling type LAN 12, the adapter channel mapping system 200 is fully compatible with being used with the type of network adapters 14 and 18 which physically cross connect Channel B to wires 3 and 6 and cross connect Channel C to wires 1 and 2 as depicted in FIG. 3A.

Figure 7:
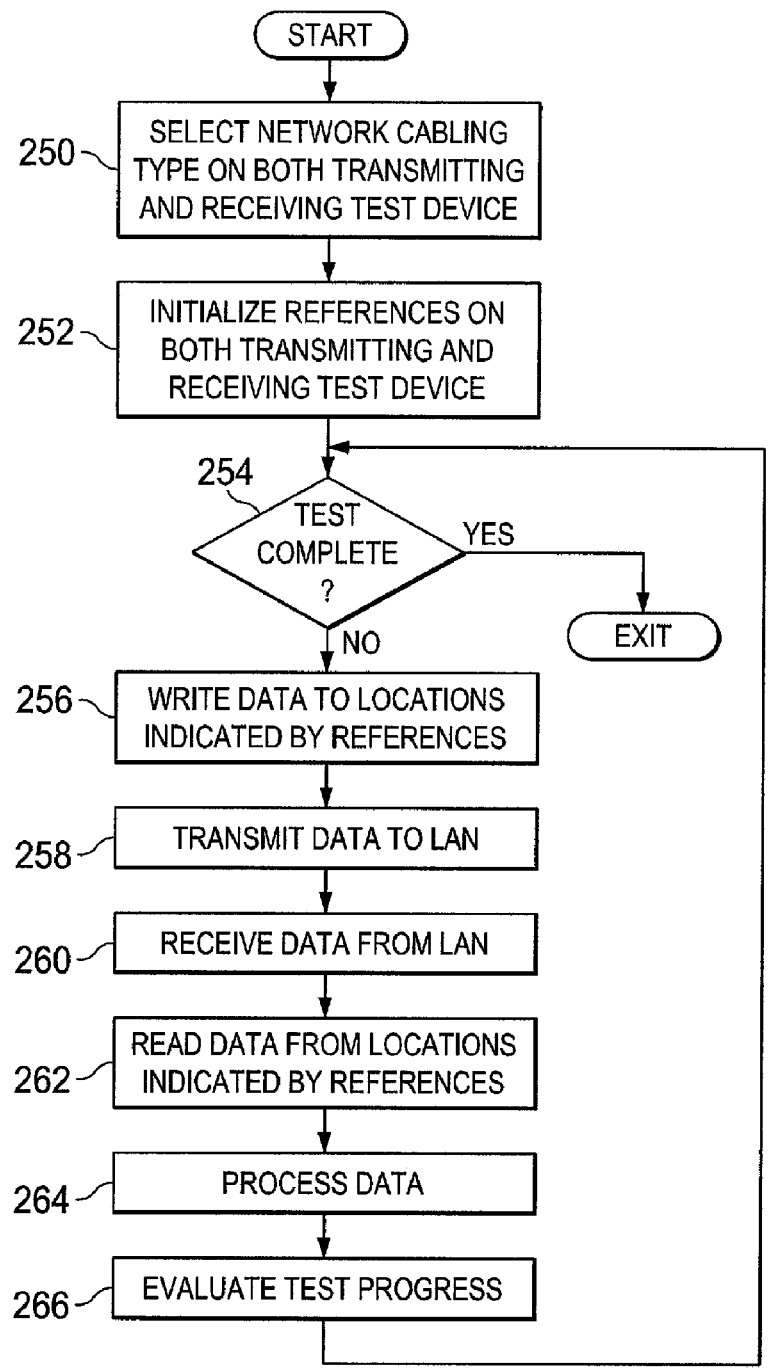
FIG. 7 depicts a flow chart of a process for using the adapter channel mapping system to test a local area network.

Turning now to FIG. 7, a flow chart depicts a method for testing the LAN 12 employing the adapter channel mapping systems 200-T and 200-R. The process begins and proceeds to block 250 where a network cabling type is selected on the adapter channel mapping system 200-T and the adapter channel mapping system 200-R. In other embodiments, the adapter channel mapping system 200-R may receive a signal over the LAN 12 from the adapter channel mapping system 200-T that indicates the network cabling type which the adapter channel mapping system 200-R is to select, or the adapter channel mapping system 200-T may receive a signal over the LAN 12 from the adapter channel mapping system 200-R that indicates the network cabling type which the adapter channel mapping system 200-T is to select, obviating the need to select the network cabling type on both the adapter channel mapping system 200-T and the adapter channel mapping system 200-R.

The process proceeds to block 252 where the addresses or the references stored in the logical channels 212-T and 212-R are initialized according to the network cabling type selected. For example, if 568A data cabling type is selected, logical channel A 214 is initialized to reference physical channel A 204, logical channel B 216 is initialized to reference physical channel B 206, logical channel C 218 is initialized to reference physical channel C 208, and logical channel D 220 is initialized to reference physical channel D 210. As another example, if 568B data cabling type is selected, logical channel A 214 is initialized to reference physical channel A 204, logical channel B 216 is initialized to reference physical channel C 208, logical channel C 218 is initialized to reference physical channel B 206, and logical channel D 220 is initialized to reference physical channel D 210.

The process proceeds to block 254 where a decision is made. If the LAN test is not complete, the process proceeds to block 256 where the test processing module 224-T requests the read/write module 222-T to write test data, such as by signals, to the physical channels 202-T using the addresses or references stored in the logical channels 212-T. For example, if data cabling type 568B is selected, the read/write module 222-T writes the channel A data 230 to the physical channel A 204, the channel B data 232 to the physical channel C 208, the channel C data 236 to the physical channel B 206, and the channel D data 238 to the physical channel D 210. The process proceeds to block 258 where the data in the physical channels 202-T are transmitted, such as in the form of signals, to the first network adapter 14 and hence to the LAN 12. Note that the data being written out to the first network adapter 14 from the physical channels 202-T effectively is crossed by the storing of addresses or references in the logical channels 212-T.

The process proceeds to block 260 where the signals on the LAN 12 are received by the second network adapter 18 and hence received by the physical channels 202-R. The process proceeds to block 262 where the test processing module 224-R requests the read/write module 222-R to sample the signals received by the physical channels 202-R using the addresses or references stored in the logical channels 212-R. For example, if data cabling type 568B is selected, the read/write module 222-R reads the physical channel A 204 to the channel A data 230, the physical channel B 206 to the channel C data 236, the physical channel C 208 to the channel B data 232, and the physical channel D 210 to the channel D data 238. Again, note that the data or signals being read from the second network adapter 18 into the physical channels 202-R effectively is crossed by the storing of addresses or references in the logical channels 212-R.

The process proceeds to block 264 where the data is processed by the test processing module 224-R. The process proceeds to block 266 where the progress of the LAN test is evaluated by the test processing module 224-R. The process returns to block 254. If at block 254 the LAN test is determined to be complete the process exits.

An alternate embodiment is a process or method of writing to and reading from the network adapter wire pairs. An example fragment of C language code implementing this process for writing data is presented below.

```
write (Channel_A, data4_5);
write (Channel_D, data7_8);
switch (selectedNetworkDataCablingType) {
    case (LAN568A): write (Channel_B, data3_6);
    write (Channel_C, data1_2); break;
    case (LAN568B): write (Channel_B, data1_2);
    write (Channel_C, data3_6); break;
}
```

This fragment assumes a variable "selectedNetworkDataCablingType" which identifies the network data cabling type under test. In this example code fragment two network data cabling types are supported—LAN568A and LAN568B. This fragment assumes a function or subroutine "write( )" which is operable to receive a data value and to write this data value out, as for example a signal, to an identified channel of the network test device 200T. In this example code fragment the identified channels consist of $Channel_{13}$ A, Channel_B, Channel_C, and Channel_D. This fragment assumes variables "data4_5" which contains the data to be written to wires 4 and 5, "data7_8" which contains the data to be written to wires 7 and 8, "data3_6" which contains the data to be written to wires 3 and 6, and "data1_2" which contains the data to be written to wires 1 and 2.

The "switch" construct of the C programming language provides alternative processing depending upon the value of the variable enclosed in parentheses following the "switch" key word. In the code fragment above, if the value of "selectedNetworkDataCablingType" is LAN568A, the code in the line containing "case (LAN568A)" is executed and then processing jumps to the line containing "other_code." The effect of the "break" statement is to cause execution to jump outside of the switch block, to the code following the switch block. If the value of "selectedNetworkDataCablingType" is LAN568B, the code in the line containing "case (LAN568B)" is executed and then processing jumps to the line containing "other_code." The effect of the "break" statement is to cause execution to jump outside of the switch block, to the code following the switch block. Note that the alternate processing of the two "case" lines effectively accomplishes the rerouting of signals which is supported by the alternate first network adapter 14 depicted in FIGS. 3A and 3B and by the logical channels 212 depicted in FIG. 4. The channel A and channel D assignments do not take place within the switch block because they are not processed differently depending upon whether LAN568A or LAN568B is the value of "selectedNetworkDataCablingType." In other embodiments having other network cabling types selectable, channel A and channel D may also be assigned within the switch block and there may be additional "case" lines associated with these other network cabling types.

An example fragment of C language code implementing this process for reading data, such as sampling signals, is presented below.

```
read (Channel_A, data4_5);
read (Channel_D, data7_8);
switch (selectedNetworkDataCablingType) {
    case (LAN568A): read (Channel_B, data3_6);
    read (Channel_C, data1_2); break;
    case (LAN568B): read (Channel_B, data1_2);
    read (Channel_C, data3_6); break;
}
```

This fragment assumes a variable "selectedNetworkDataCablingType" and a function or subroutine "read( )" which is operable to read a data value in from an identified channel and assign this data value to an identified variable. This fragment assumes variables "data4_5" which contains the data to be read from wires 4 and 5, "data7_8" which contains the data to be read from wires 7 and 8, "data3_6" which contains the data to be read from wires 3 and 6, and "data1_2" which contains the data to be read from wires 1 and 2. The logic of this "read" fragment is very similar to the "write" fragment above. Again, the alternate processing of the two "case" lines effectively accomplishes the rerouting of data which is supported by the alternate network adapters 14 depicted in FIGS. 3A and 3B and by the logical channels 212 depicted in FIG. 4. The channel A and channel D reads do not take place within the switch block because they are not processed differently depending upon whether LAN568A or LAN568B is the value of "selectedNetworkDataCablingType." In other embodiments having other network cabling types selectable, channel A and channel D may also be read within the switch block and there may be additional "case" lines associated with these other network cabling types.

Note that the process or method for writing to and reading from the network adapter pairs described using C language code above may be implemented in any general purpose programming language including, but not limited to, C++, Java, and assembly language. The above example code fragments could be adapted to other programming languages by those skilled in the art. Additionally, while the above example code fragments are directed towards mapping network adapter 568A and 568B channels, this approach could be readily extended to map other network adapter wire configuration standards. For example, this embodiment is readily extended to provide adapter channel mapping for either fewer or more channels, for example in the case that the network being tested is not an eight wire, four pair cable but instead has fewer or more wires and pairs. Further, those skilled in the art will recognize that the logic of the above segments may be expressed in other implementations. For example, the "switch" construct could be replaced by an "if-else" construct. For example, the two "write( )" operations associated with each "case" line may be arranged on independent lines and the "break" statement may be arranged on an independent line without affecting the logical processing. Also, the above are code fragments and are not suitable to execute without the provision of a programming context including definitions of variables, inclusion of definitions of necessary types, assignment of the values of the variables data1_2, data3_6, data4_5, data7_8, and other requirements which are readily supplied by those skilled in the art.

Again, while the code fragments above contemplate obviating the need to employ a separate set of network adapters 14 and 18 to test a 568B network cabling type LAN 12, this embodiment is fully compatible with being used with the type of network adapters 14 and 18 which physically cross connect Channel B to wires 3 and 6 and cross connect Channel C to wires 1 and 2 as depicted in FIG. 3A.

In some embodiments it may be advantageous to embed the processing capabilities and logical wire crossing functionality discussed above in the first network adapter 14 and the second network adapter 18 instead of in the adapter channel mapping system 200. Power to a processor and support chips embedded in the first network adapter 14 and the second network adapter 18 may be provided by a dedicated power line connected to the adapter channel mapping systems 200-T and 200-R. Power may be provided by batteries on the first network adapter 14 and the second network adapter 18. Power may be provided by a radio frequency power field captured by an antenna on the first network adapter 14 and the second network adapter 18 and emitted by a radio frequency power source on the adapter channel mapping systems 200-T and 200-R or emitted by a dedicated radio frequency power field source. Power may be supplied by other well known means for supplying power to embedded processors and chips. A physical switch may be provided on the first network adapter 14 and the second network adapter 18 to select between data cabling types, a select line may be provided for the adapter channel mapping systems 200-T and 200-R to communicate a data cabling type selection to the first network adapter 14 and the second network adapter 18. The adapter channel mapping systems 200-T and 200-R may communicate the selection of a data cabling type to the first network adapter 14 and the second network adapter 18 through contactless communication, for example employing radio waves. The selection of a data cabling type may be conveyed to the first network adapter 14 and the second network adapter 18 through other ways known to those skilled in the art. Additionally, the first network adapter 14 and the second network adapter 18 may be physically constructed so that a mechanical switch can be thrown to configure the network adapters 14 and 18 to support either 568A or 568B network cabling types.

Figure 8:
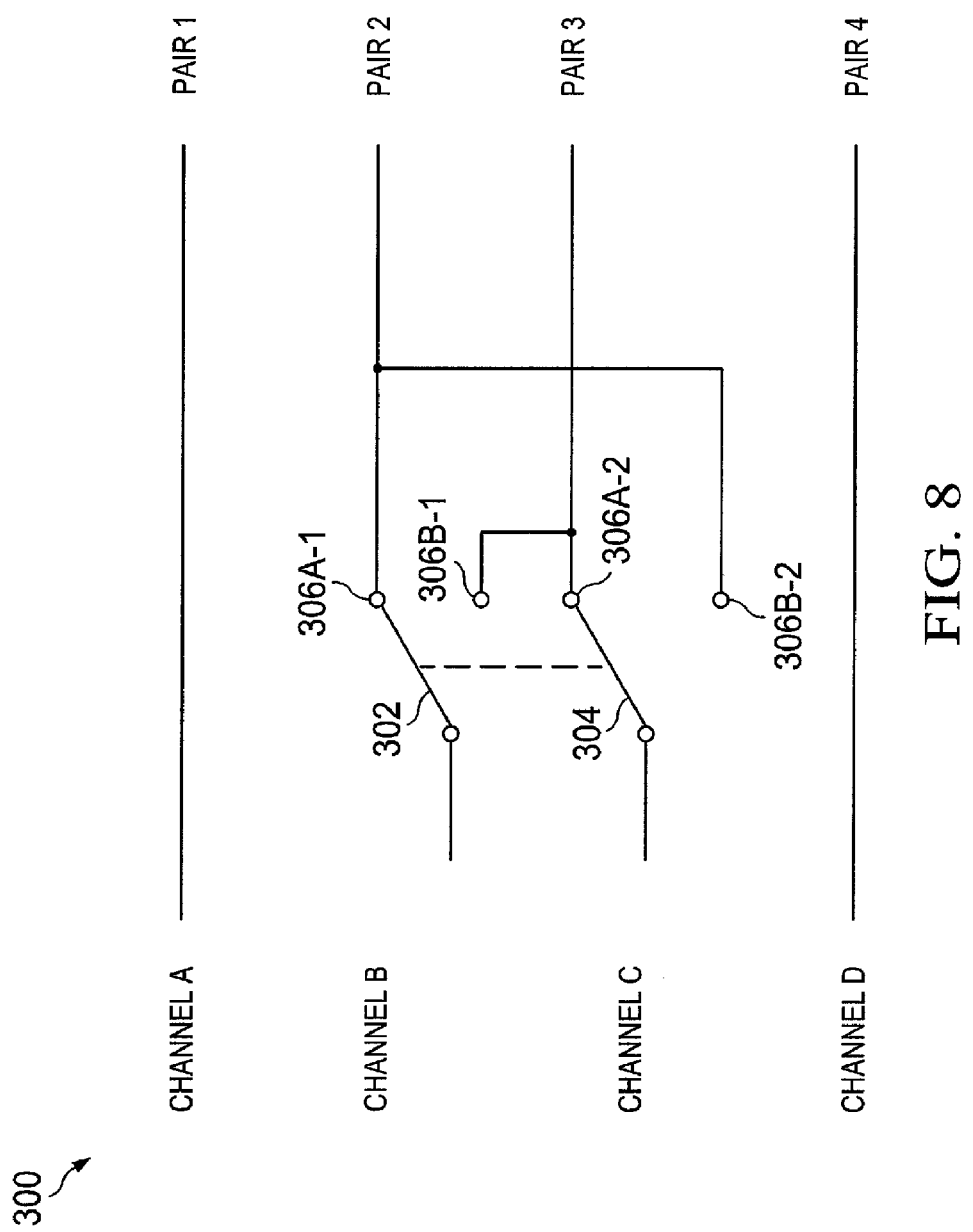
FIG. 8 depicts a network adapter containing mechanical switch which supports both direct and cross connecting channel B and channel C to pair 2 and pair 3.

Turning now to FIG. 8, a network adapter 300 containing a mechanical switch which supports both direct and cross connecting channel B to pair 2 and channel C to pair 3 is depicted. The mechanical switch is of the double-pole, double-throw variety. When the switch is thrown from one position to another, a first switch pole 302 and a second switch pole 304, which are mechanically ganged to each other, are both thrown from one position to another. In the 568A position, switch pole 302 contacts a first switch contact 306A-1 and switch pole 304 contacts a second switch contact 306A-2. In the 568A position, channel B is connected to pair 2 and channel C is connected to pair 3, the channel mapping associated with network cabling type 568A. Toggling the switch to the 568B position, switch pole 302 contacts a third switch contact 306B-1 and switch pole 304 contacts a fourth switch contact 306B-2. In the 568B position, channel B is connected to pair 3 and channel C is connected to pair 2, the channel mapping associated with network cabling type 568B. By toggling the switch from one position to another, the network adapter 300 may be selected to support either 568A or 568B network cabling. This accomplishes adapter channel mapping mechanically in a single network adapter. This mechanical switch may be extended to support switching between other network cabling types and may be adopted to either more or fewer wire pairs.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What is claimed is:

1. An adapter channel mapping system for mapping channels of a network, comprising:
    a memory component operable to communicate with the network and having a first memory portion and a second memory portion, the first memory portion operable to communicate with a first physical channel of the network corresponding to at least a first cabling wire and the second memory portion operable to communicate with a second physical channel of the network corresponding to at least a second cabling wire;
    a mapping component operable to map each one of the first and second memory portions to one of the first and second physical channels based on a first configuration of the network and further operable to map each one of the first and second memory portions to one of the first and second physical channels based on a second configuration of the network; and
    a selector component in communication with the mapping component and operable in a first selection mode to cause the mapping component to map based on the first map and operable in a second selection mode to map based on the second map, wherein the selector component is further defined as a user interface operable for a user to select one of the first and second modes associated with one of the first and second network configurations, the user interface coupled to communicate the selection to the mapping component.

2. The adapter channel mapping system of claim 1, wherein the selector component automatically detects the network configuration.

3. The adapter channel mapping system of claim 1, wherein the selector component is further defined as a switch in communication with the mapping component, the switch having a first switch position associated with the first selection mode and a second switch position associated with the second selection mode.

4. An adapter channel mapping system for mapping channels of a network employing a first wired pair associated with a first network channel, a second wired pair associated with a second network channel, a third wired pair associated with a third network channel, a fourth wired pair associated with a fourth network channel, the adapter channel mapping system comprising:
    a test device coupleable to a channel adapter of the network;
    a memory component coupled to the test device having a first, second, third, and fourth memory portions, the first memory portion coupleable to communicate with the first network channel, the second memory portion coupleable to communicate with the second network channel, the third memory portion coupleable to communicate with the third network channel, and the fourth memory portion coupleable to communicate with the fourth network channel; and
    a mapping component operable to map a first variable to first memory portion and a fourth variable to the fourth memory portion, the mapping component operable to selectively map a second and third variables between the second and third memory portions based on a configuration of the network.

5. The adapter channel mapping system of claim 4, wherein the mapping component is further defined as a software component.

6. The adapter channel mapping system of claim 4, wherein the mapping component is further defined as a series of instructions.

7. The adapter channel mapping system of claim 4, wherein the mapping component is further defined as a pointer directing at least the second and third variables between one of the second and third memory portions.

8. The adapter channel mapping system of claim 4, wherein a first network configuration employs a 568A channel adapter wherein the second wired pair is associated with a $3^{rd}$ and $6^{th}$ wires and the third wired pair is associated with a $1^{st}$ and $2^{nd}$ wires and wherein a second network configuration employs a 568B channel adapter wherein the second wired pair is associated with a $1^{st}$ and $2^{nd}$ wires and the third wired pair is associated with a $3^{rd}$ and $6^{th}$ wires.

9. The adapter channel mapping system of claim 8, wherein the mapping component maps the second variable to the second memory portion associated with the second wired pair and maps the third variable to the third memory portion associated with the third wired pair when the network configuration employs 568A channel adapter and wherein the mapping component maps the third variable to the second memory portion associated with the second wired pair and maps the second variable to the third memory portion associated with the third wired pair when the network configuration employs a 568B channel adapter.

10. The adapter channel mapping system of claim 9, wherein the mapping component is further defined as a software component including a Boolean statement selectable based on the network employing one of 568A and 568B channel adapters.

* * * * *